United States Patent
Yuan et al.

(10) Patent No.: US 11,303,344 B2
(45) Date of Patent: Apr. 12, 2022

(54) METHODS AND DEVICES FOR BEAM REPORT TRANSMISSION AND RECEIVING

(71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 28 days.

(21) Appl. No.: 16/763,678

(22) PCT Filed: Nov. 13, 2017

(86) PCT No.: PCT/CN2017/110723
§ 371 (c)(1),
(2) Date: May 13, 2020

(87) PCT Pub. No.: WO2019/090775
PCT Pub. Date: May 16, 2019

(65) Prior Publication Data
US 2020/0344770 A1    Oct. 29, 2020

(51) Int. Cl.
| | |
|---|---|
| *H04B 7/06* | (2006.01) |
| *H04B 7/08* | (2006.01) |
| *H04W 72/04* | (2009.01) |
| *H04W 72/10* | (2009.01) |
| *H04W 24/10* | (2009.01) |

(52) U.S. Cl.
CPC ......... *H04B 7/0695* (2013.01); *H04B 7/0626* (2013.01); *H04B 7/0632* (2013.01);
(Continued)

(58) Field of Classification Search
CPC .. H04B 7/0695; H04B 7/0626; H04B 7/0632; H04B 7/088; H04W 24/10; H04W 72/0413; H04W 72/046; H04W 72/10
See application file for complete search history.

(56) References Cited

U.S. PATENT DOCUMENTS

2018/0219664 A1     8/2018  Guo et al.
2019/0068268 A1*    2/2019  Zhang ................. H04B 7/0639
(Continued)

FOREIGN PATENT DOCUMENTS

EP          3799506 A1 *  3/2021  ............ H03M 13/09
WO       2017/173177 A1    10/2017
(Continued)

OTHER PUBLICATIONS

Huawei et al., "Details of CSI reporting on PUCCH/PUSCH", 3GPP TSG RAN WG1 Meeting #90bis, R1-1717300, Oct. 9-13, 2017, (total 3 pages).
(Continued)

*Primary Examiner* — Deepa Belur
(74) *Attorney, Agent, or Firm* — Sughrue Mion, PLLC

(57) ABSTRACT

Embodiments of the present disclosure relate to a method, terminal device and apparatus for beam report transmission and a method, network node and apparatus for a beam report receiving. In an embodiment of the present disclosure, the method for beam report transmission may include dropping, in response to a collision between a beam report and another uplink control information, a lower-priority one of the beam report and the other uplink control information based on a predetermined priority rule defining a transmission priority of the beam report and the other uplink control information. With embodiments of the present disclosure, it is possible to provide a simple but efficient solution for addressing the collision.

1 Claim, 11 Drawing Sheets

| DCI( '0' ) | S- PUCCH | A-BM> | A-WB-I-CSI> | S-BM> | S-WB-I-CSI> | P-BM> | P-WB-I-CSI |
|---|---|---|---|---|---|---|---|
| DCI( '0' ) | L- PUCCH | S-BM> | S-WB-I-CSI> | P-BM> | S-II-CSI-P1> | S-SB-I-CSI> | P-WB-I-CSI |
| DCI( '0' ) | PUSCH | A-BM> | A-CSI> | S-BM> | S-CSI | | |

(52) U.S. Cl.
CPC ............ *H04B 7/088* (2013.01); *H04W 24/10* (2013.01); *H04W 72/046* (2013.01); *H04W 72/0413* (2013.01); *H04W 72/10* (2013.01)

(56) References Cited

U.S. PATENT DOCUMENTS

| | | | |
|---|---|---|---|
| 2019/0261361 A1* | 8/2019 | Xiong | ............... H04W 72/1247 |
| 2020/0099435 A1 | 3/2020 | Kang et al. | |
| 2020/0322030 A1* | 10/2020 | Yuan | ..................... H04L 5/0091 |

FOREIGN PATENT DOCUMENTS

| | | | | |
|---|---|---|---|---|
| WO | 2019/039843 A1 | | 2/2019 | |
| WO | WO-2019099659 A1 | * | 5/2019 | ........ H04W 72/0493 |

OTHER PUBLICATIONS

Catt, "CSI feedback for beamformed CSI-RS on PUCCH", 3GPP TSG RAN WG1 Meeting #82, R1-153945, Aug. 24-28, 2015, (total 4 pages).

Ericsson, "On CSI reporting", 3GPP TSG-RAN WG1 NR Ad Hoc #3, R1-1716349, Sep. 18-21, 2017, (total 11 pages).

Communication dated Oct. 6, 2020 from European Patent Office in EP Application No. 17931128.7.

Communication dated Dec. 15, 2020 by the Japanese Patent Office in application No. 2020-526282.

Mitsubishi Electric "Views on SRS designs", 3GPP TSG RAN WG1 Meeting, R1-1712750, Aug. 21-25, 2017, 12 pgs., Prague, Czech Republic.

ADHOC Chair (Samsung), "RAN1 session notes for agenda item 7.2 (MIMO)", 3GPP TSG RAN WG1 Meeting 90bis, R1-1718681, Oct. 9-13, 2017, pp. 1-28, Prague, CZ.

Samsung, "PUCCH resource configuration for bandwidth restricted UE", 3GPP TSG RAN WG1 meeting 90bis, R1-1717661, Oct. 9-13, 2017, 3 pgs., Prague, CZ.

International Search Report for PCT/CN2017/110723 dated Jul. 30, 2018 (PCT/ISA/210).

Written Opinion of the International Searching Authority for PCT/CN2017/110723 dated Jul. 30, 2018 (PCT/ISA/237).

U.S. Office Action and PTO-892 for U.S. Appl. No. 16/886,871 dated Dec. 8, 2021.

* cited by examiner

100

> In response to a collision between a beam report and another uplink control information, dropping a lower-priority one of the beam report and the other uplink control information based on a predetermined priority rule defining a transmission priority of the beam report and the other uplink control information. ⎯101

Fig. 1

|  | Periodic Beam Reporting | Semi-persistent Beam Reporting | Aperiodic Beam Reporting |
|---|---|---|---|
| Supporting Channels | • Short PUCCH<br>• Long PUCCH | • Short/Long PUCCH<br>• PUSCH | • Short PUCCH<br>• PUSCH |

Fig. 2

|  | Periodic CSI (P-CSI) | Semi-persistent CSI (SP-CSI) | Aperiodic CSI (A-CSI) |
|---|---|---|---|
| Frequency granularity | Wideband or partial band | Wideband, partial band, or subband | Wideband, partial band, or subband |
| Supporting Channels | Type I CSI<br>• Short PUCCH<br>• Long PUCCH | Type I CSI<br>• Short PUCCH<br>• Long PUCCH<br>• PUSCH<br>Type II CSI<br>• Long PUCCH (only part 1)<br>• PUSCH | Type I CSI<br>• Short PUCCH<br>• PUSCH<br>Type II CSI<br>• PUSCH |

Fig. 3

| DCI('0') | S-PUCCH | A-BM⟩ | A-WB-I-CSI⟩ | S-BM⟩ | S-WB-I-CSI⟩ | P-WB-I-CSI |
| --- | --- | --- | --- | --- | --- | --- |
| DCI('0') | L-PUCCH | S-BM⟩ | S-WB-I-CSI⟩ | P-BM⟩ | S-SB-I-CSI⟩ | P-WB-I-CSI |
| DCI('0') | PUSCH | A-BM⟩ | A-CSI⟩ | S-BM⟩ | S-CSI | |

Fig. 4A

| BFRQ | S-PUCCH | A-BM⟩ | S-BM⟩ | P-BM⟩ | A-WB-I-CSI⟩ | S-WB-I-CSI⟩ | P-WB-I-CSI |
| --- | --- | --- | --- | --- | --- | --- | --- |
| BFRQ | L-PUCCH | S-BM⟩ | P-BM⟩ | S-WB-I-CSI⟩ | S-II-CSI-P1⟩ | S-SB-I-CSI⟩ | P-WB-I-CSI |
| BFRQ | PUSCH | A-BM⟩ | S-BM⟩ | A-CSI⟩ | S-CSI | | |

Fig. 4B

| DCI('1') | S-PUCCH | A-WB-I-CSI⟩ | S-WB-I-CSI⟩ | P-WB-I-CSI⟩ | A-BM⟩ | S-BM⟩ | P-BM |
| --- | --- | --- | --- | --- | --- | --- | --- |
| DCI('1') | L-PUCCH | S-WB-I-CSI | S-II-CSI-P1⟩ | S-SB-I-CSI⟩ | P-WB-I-CSI⟩ | S-BM⟩ | P-BM |
| DCI('1') | PUSCH | A-CSI⟩ | S-CSI⟩ | A-BM⟩ | S-BM | | |

> In response to a collision between a beam report and another uplink control information, multiplexing the beam report and the other uplink control information on an uplink transmission resource available for addressing the collision — 501

Fig. 5

| Collision Cases | Short PUCCH | Long PUCCH | PUSCH |
|---|---|---|---|
| Possible UCI | {A-BM, S-BM, P-BM}, and {A-WB-I-CSI, S-WB-I-CSI, P-WB-I-CSI} | {S-BM, P-BM} and {S-WB-I-CSI, S-SB-I-CSI, S-II-CSI-P1, P-WB-I-CSI} | {A-BM, S-BM} and {A-CSI, S-CSI} |
| Solution | 1. Offload to long PUCCH of two separately-coded parts<br>2. Offload to PUSCH | 1. Offload to long PUCCH (format 3 ->4) of two separately-coded parts<br>2. Offload to PUSCH | Drop low priority parts |

Fig. 6

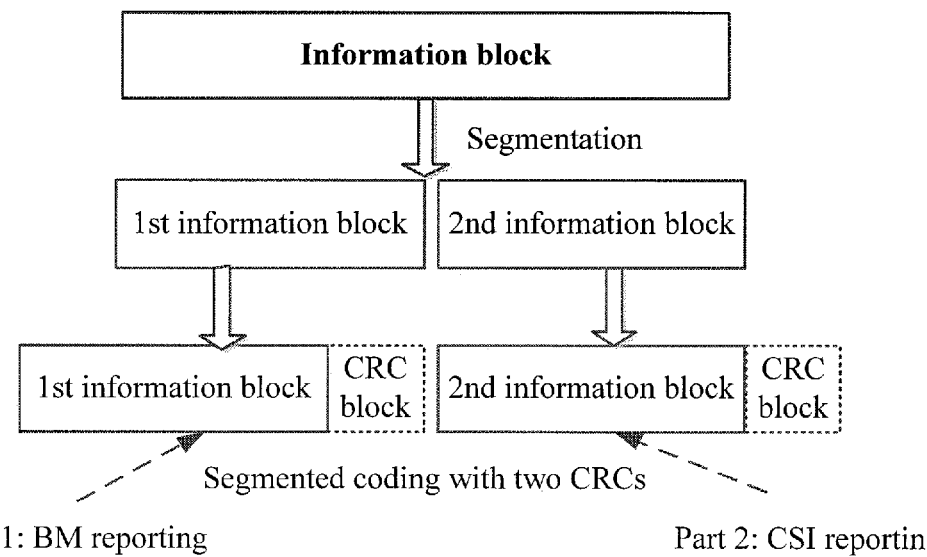

Part 1: BM reporting    Part 2: CSI reporting

Fig. 7

| Resource configuration indicator | Periodic Beam Reporting + HARQ | Semi - persistent Beam Reporting+ HARQ | Aperiodic Beam Reporting + HARQ |
|---|---|---|---|
| 000 BM-on Short PUCCH ("default") | 2 TDMed Short PUCCH | 2 TDMed Short PUCCH | 2 TDMed Short PUCCH |
| 001 BM-on Short PUCCH | 1 Short PUCCH (>2 bits) with separately coded two parts: Part 1-HARQ; Part 2- BM | 1 Short PUCCH (>2 bits) with separately coded two parts: Part 1-HARQ; Part 2- BM | 1 Short PUCCH (>2 bits) with separately coded two parts: Part 1-HARQ; Part 2- BM |
| 011 BM on Long PUCCH ("default") | TDMed Short PUCCH + Long PUCCH | TDMed Short PUCCH + Long PUCCH | |
| 010 BM on Long PUCCH | 1 Long PUCCH (>2 bits) with separately coded two parts: Part 1-HARQ; Part 2- BM | 1 Long PUCCH (>2 bits) with separately coded two parts: Part 1-HARQ; Part 2- BM | |
| 100 BM on PUSCH ("default and UE capability") | | Piggyback on PUSCH | Piggyback on PUSCH |
| 101 BM on PUSCH ("default and UE capability") | | HARQ on PUCCH+ SP- BM on PUSCH | HARQ on PUCCH+ A BM on PUSCH |

Fig. 8

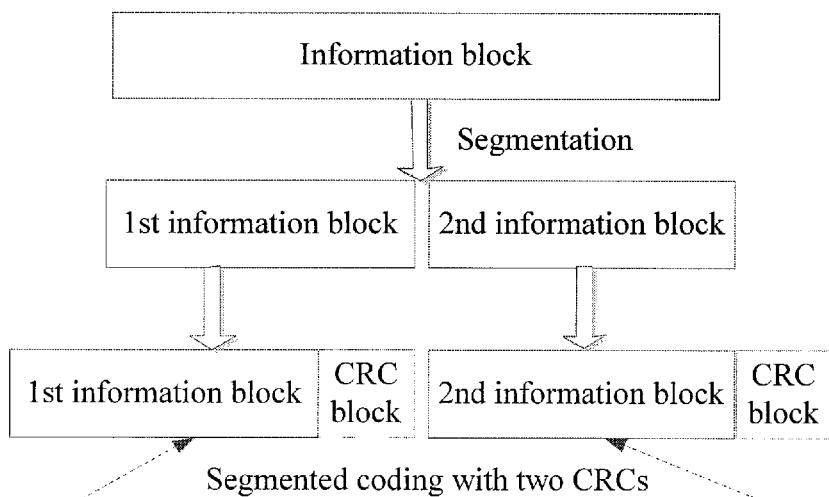

Fig. 9

| Payload | Periodic Beam Reporting | Semi- persistent Beam Reporting | Aperiodic Beam Reporting |
|---|---|---|---|
| P1 (e.g., L1<L3 bits) | Short PUCCH | ShortPUCCH | Short PUCCH |
| P2(e.g., L2<L5 bits) | Long PUCCH | Long PUCCH | |
| P3(e.g., L4 < L6bits) | | PUSCH | PUSCH |

Fig. 10

| Payload | Periodic Beam Reporting | Semi- persistent Beam Reporting | Aperiodic Beam Reporting |
|---|---|---|---|
| N1 (N=<2) | Short PUCCH | Short PUCCH | Short PUCCH |
| N2 (N=<4) | Long PUCCH | Long PUCCH | |
| N3 (N=<4) | | PUSCH | PUSCH |

1201 — Transmitting a first beam report segment containing an identity for a first beam, a channel quality indication for the first beam and a subsequent segment indication information for indicating whether a subsequent beam report segment is present or not 1202 — Transmitting, only if the subsequent segment indication information indicates that the subsequent beam report segment is present, at least one subsequent beam report segment containing information on at least one subsequent beam

Fig. 12

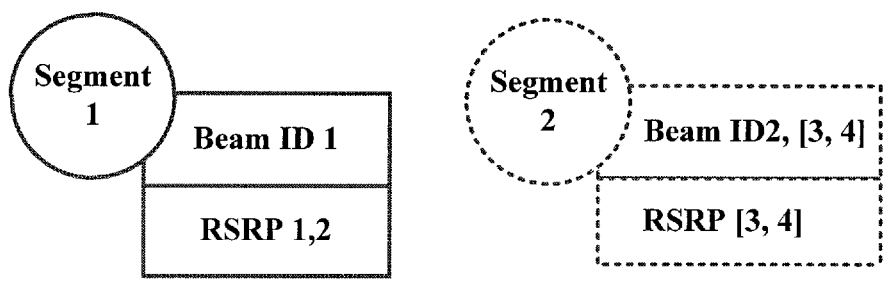
Fig. 13
| Segment 1/2 Payload size | N=1 | N=2 | N=3 | N=4 |
|---|---|---|---|---|
| K=64 | N.A. | 17/6 | 17/16 | 17/26 |
| K=32 | N.A. | 16/5 | 16/14 | 16/23 |
| K=16 | N.A. | 15/4 | 15/12 | 15/20 |
| K=8 | N.A. | 14/3 | 14/10 | 14/17 |
Fig. 14
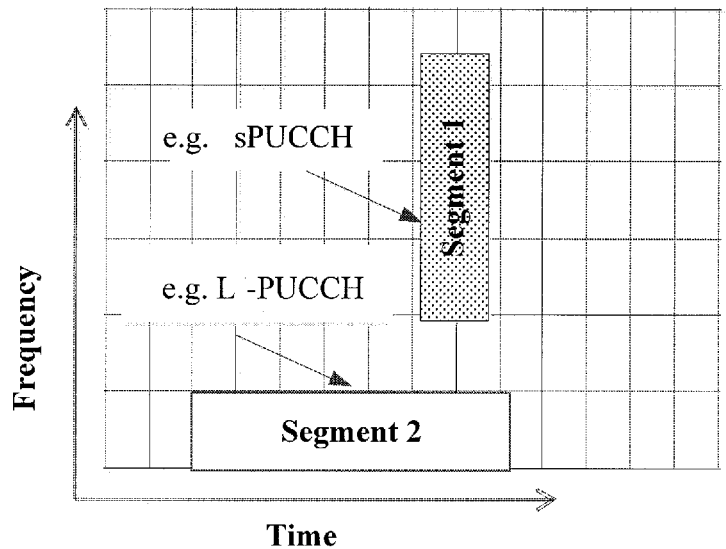
Fig. 15

Segmented coding with two CRCs

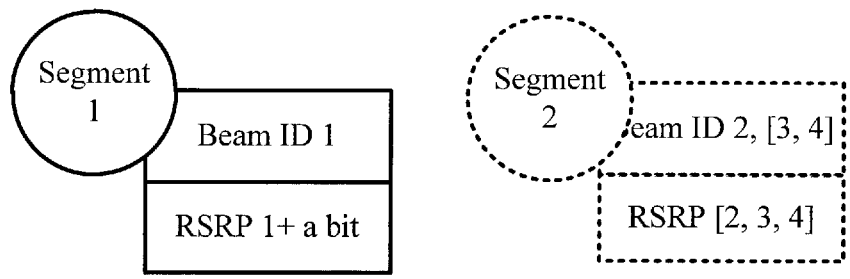
Fig. 18
| Segment 1/2 Payload size | N=1 | N=2 | N=3 | N=4 |
|---|---|---|---|---|
| K=64 | N.A. | 14/10 | 14/20 | 14/30 |
| K=32 | N.A. | 13/9 | 13/18 | 13/27 |
| K=16 | N.A. | 12/8 | 12/16 | 12/24 |
| K=8 | N.A. | 11/7 | 11/14 | 11/21 |
Fig. 19
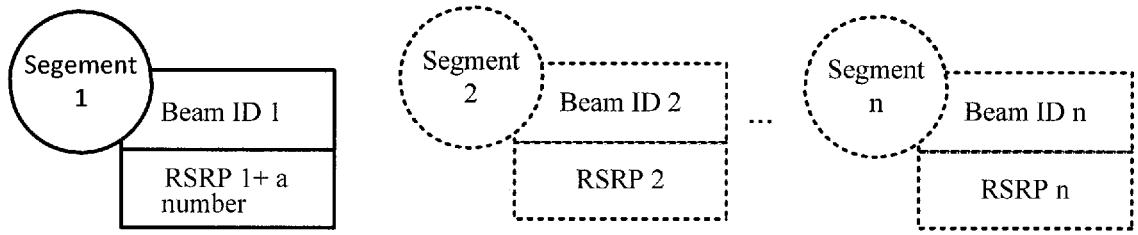
Fig. 20

US 11,303,344 B2

METHODS AND DEVICES FOR BEAM REPORT TRANSMISSION AND RECEIVING

CROSS REFERENCE TO RELATED APPLICATIONS

This application is a National Stage of International Application No. PCT/CN2017/110723 filed Nov. 13, 2017.

FIELD OF THE INVENTION

The non-limiting and exemplary embodiments of the present disclosure generally relate to the field of wireless communication techniques, and more particularly relate to a method, terminal device and apparatus for beam report transmission and a method, network node and apparatus for beam report receiving.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In 3GPP RAN1 #90bis meeting, it was agreed that:
For non-grouping based beam reporting, the following report parameters are supported:
  The maximal number of configured transmission (Tx) beams for beam measurement: K equals to 64
  The maximal number of configured Tx beams to be reported in one instance: N_max=2, 4, where a subset of N (N<=N_max where N=1, 2, 3, 4) beams can be selected by the gNB and indicated to the UE (the signaling mechanism is for further study)
  Reporting differential L1-Reference Signal Received Power (L1-RSRP) when multiple beams are reported in one reporting instance. Reference is the largest L1-RSRP in that reporting instance.
  Bit-width: 7 bits for L1-RSRP ranging from −140 dBm to −44 dBm with 1 dB stepping size (analogous with long Term Evolved (LTE)) and 4 bits for differential L1-RSRP.
Besides, it was also agreed in 3GPP RAN1 #90bis that:
For L1-RSRP and/or beam resource indicator (e.g. the indicator of Channel State Information Reference Signal (CSI-RS) or Synchronization Signal Block (SSB)) reporting for beam management, the following uplink (UL) channels are supported: short Physical Uplink Control Channel (Short PUCCH, or S-PUCCH), long PUCCH (L-PUCCH) and Physical Uplink Shared Channel (PUSCH). For beam management on the above channels, the following reporting types are supported
  Periodic—supporting long PUCCH and short PUCCH
  Semi-persistent—supporting long PUCCH, short PUCCH and PUSCH
  Aperiodic—supporting PUSCH and short PUCCH
In addition to the beam report, Channel State Information (CSI) can also be transmitted on the long PUCCH, short PUCCH, and PUSCH. Therefore, beam reporting might have collision with CSI reporting.

In the LTE system, there is only one available PUCCH channel in one slot for a terminal device like User Equipment (UE), while in NR system, UE can support multiple PUCCHs for example, short PUCCH (<=2 bit)+short PUCCH (>2 bits), or short PUCCH format 2+long PUCCH format 3 in the same slot for uplink control information (UCI) transmission.

In a beam reporting instance, UE can be configured to report N different Tx beams that can be received simultaneously, where N is configured by the gNB, where N<=Nmax. However, UE may report N or fewer beams in a given reporting instance, which means that the actual reporting payload may vary based on UE's beam detection.

In the existing solution, the payload for beam reporting is uniformed to a given PUCCH format, and a default value is used for quantizing a beam RSRP in outage and additional padding bits can be used. In such a case, beam reporting may carry much less information payload than what is accommodated by reporting channel resources.

In view of the above, there is a need for improved solution for beam report transmission.

SUMMARY OF THE INVENTION

To this end, in the present disclosure, there is provided a new solution for beam reporting, to mitigate or at least alleviate at least part of the issues in the prior art.

According to a first aspect of the present disclosure, there is provided a method for beam report transmission. The method may comprise in response to a collision between a beam report and another uplink control information, dropping a lower-priority one of the beam report and the other uplink control information based on a predetermined priority rule defining a transmission priority of the beam report and the other uplink control information.

According to a second aspect of the present disclosure, there is provided a method for beam report receiving. The method may comprise in response to a collision between a beam report and another uplink control information, receiving a higher-priority one of the beam report and the other uplink control information based on a predetermined priority rule defining a transmission priority of the beam report and the other uplink control information.

According to a third aspect of the present disclosure, there is provided a terminal device. The terminal device may comprise a processor, configured to, in response to a collision between a beam report and another uplink control information, drop a lower-priority one of the beam report and the other uplink control information based on a predetermined priority rule defining a transmission priority of the beam report and the other uplink control information.

According to a fourth aspect of the present disclosure, there is provided a network node. The network node may comprise a processor, configured to, in response to a collision between a beam report and another uplink control information, receive a higher-priority one of the beam report and the other uplink control information based on a predetermined priority rule defining a transmission priority of the beam report and the other uplink control information.

According to a fifth aspect of the present disclosure, there is provided a terminal device. The terminal device may comprise a processor and a memory. The memory may be coupled with the processor and having program codes therein, which, when executed on the processor, cause the terminal device to perform operations of the first aspect.

According to a sixth aspect of the present disclosure, there is provided a network node. The network node may comprise a processor and a memory. The memory may be coupled with the processor and have program codes therein, which, when executed on the processor, cause the network node to perform operations of the second aspect.

According to a seventh aspect of the present disclosure, there is provided a computer-readable storage media with computer program codes embodied thereon, the computer program codes configured to, when executed, cause an apparatus to perform actions in the method according to any embodiment in the first aspect.

According to an eighth aspect of the present disclosure, there is provided a computer-readable storage media with computer program codes embodied thereon, the computer program codes configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, it is possible to provide a simple but efficient solution for addressing the collision.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 1 schematically illustrates a flow chart of a method for beam report transmission according to an embodiment of the present disclosure;

FIG. 2 schematically illustrates uplink channels for beam reporting;

FIG. 3 schematically illustrates uplink channels for CSI reporting;

FIGS. 4A to 4C schematically illustrate several example priority rules defining the transmission priority according to embodiments of the present disclosure;

FIG. 5 schematically illustrates a flow chart of another method for beam reporting transmission according to an embodiment of the present disclosure;

FIG. 6 schematically illustrates a table of possible offloading solutions for difference cases according to an embodiment of the present disclosure;

FIG. 7 schematically illustrates a diagram of beam (BM) reporting and CSI reporting in two separately coded parts of PUCCH for beam reporting and CSI reporting according to an embodiment of the present disclosure;

FIG. 8 schematically illustrates a table of multiplexing strategies of beam reporting and Hybrid Automatic Repeat request (HARQ) according to an embodiment of the present disclosure;

FIG. 9 schematically illustrates a diagram of BM reporting and HARQ transmission in two separately coded parts of PUCCH for beam reporting and CSI reporting according to an embodiment of the present disclosure;

FIG. 10 schematically illustrates resource selection rules of beam reporting based payload size according to an embodiment of the present disclosure;

FIG. 11 schematically illustrates resource selection rules of beam reporting based the number of reported beams according to an embodiment of the present disclosure;

FIG. 12 schematically illustrates a flow chart of a further method for beam report transmission according to an embodiment of the present disclosure;

FIG. 13 schematically illustrates a diagram of example beam report segments according to an embodiment of the present disclosure;

FIG. 14 schematically illustrates a table of payload size of two beam report segments according to the solution as described in FIG. 13;

FIG. 15 schematically illustrates an example transmission of two beam report segments according an embodiment of the present disclosure;

FIG. 18 schematically illustrates a diagram of other example beam report segments according to an embodiment of the present disclosure;

FIG. 19 schematically illustrates a table of payload size of two beam report segments according to the solution as described in FIG. 18;

FIG. 20 schematically illustrates a diagram of further example beam report segments according to an embodiment of the present disclosure;

DETAILED DESCRIPTION OF EMBODIMENTS

Figure 16:
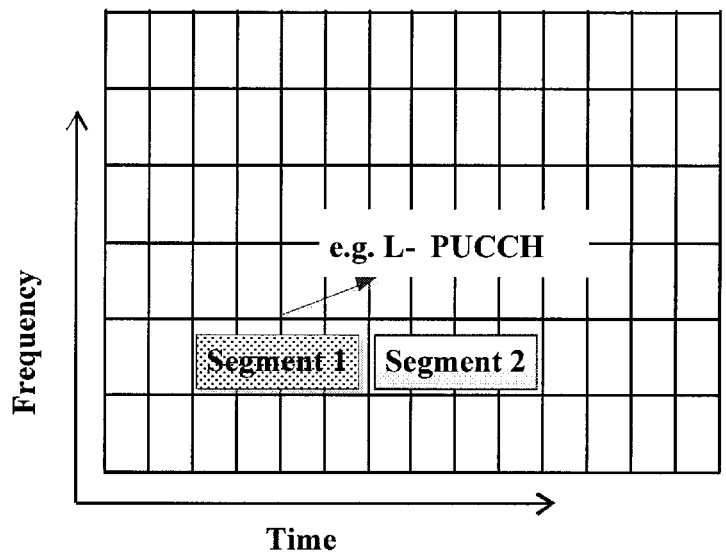
FIG. 16 schematically illustrates another example transmission of two beam report segments according an embodiment of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

In the present disclosure, there are proposed new solutions for beam report transmission and receiving, which could mitigate or at least alleviate at least part of the issues in the prior art. Hereinafter, reference will be further made to FIGS. 1 to 27 to describe the solutions as proposed in the present disclosure in details. It shall be appreciated that the following embodiments are given only for illustrative purposes and the present disclosure is not limited thereto. It shall be also appreciated that hereinafter, different aspects of the present disclosure might be described separately but these aspects can be combined as well.

Reference is first made to FIG. 1, which illustrates a flow chart of a method 100 for beam report transmission according to an embodiment of the present disclosure. The method 100 can be performed at a terminal device, for example UE, or other like terminal devices.

As illustrated in FIG. 1, in step 101, in response to a collision between a beam report and another uplink control information, a lower-priority one of the beam report and the other uplink control information is dropped based on a predetermined priority rule defining transmission priority of the beam report and the other uplink control information.

As mentioned in background, for beam management, short PUCCH, long PUCCH and PUSCH are all supported: Meanwhile other uplink control information like the CSI can also be transmitted on short PUCCH, long PUCCH, and PUSCH. Thus, there might be a transmission collision between beam report and the other uplink control information like CSI. Hereinafter, for illustrative purposes, CSI will be taken as an example, however the skilled in the art can readily know that the present disclosed it not limited thereto, any uplink control information that might have a collision with the beam report may also benefit from the solution provided herein.

For illustrative purpose, FIG. 2 and FIG. 3 illustrate tables of uplink channels for beam reporting and uplink channels for CSI reporting, respectively. From FIG. 2 and FIG. 3, it can be seen that there is a potential probability that the beam reporting has a collision with CSI reporting since they can both be transmitted on long PUCCH, short PUCCH, or PUSCH. In such a case, the payload size of beam report and the other uplink control information might be too large to be carried by a reporting channel. In the present disclosure, it is proposed to adopt, when such a collision occurs, a dropping strategy to drop at least part of them. For example, as illustrated in step 101, UE may drop a lower-priority one of the beam report and CSI based on a predetermined priority rule.

The predetermined priority rule may define transmission priority of the beam report and the other uplink control information (for example CSI). With reference to the transmission priority, UE may determine which one of the beam report and the other uplink control information can be dropped.

In an embodiment of the present disclosure, the predetermined priority rule may define the transmission priority based on timing requirement. The stricter the information requires the timing, the higher the transmission priority. For example, considering time requirements of these types of information, it may determine the transmission priority of A (aperiodic reporting information), S (semi-persistent reporting information) and P (periodic reporting information) as A>S>P. In addition, it may further specify in each of A, S, and P, the beam reporting has a higher transmission priority than CSI reporting.

For illustrative purpose, FIG. 4A illustrates an example timing-first priority rule, which defines an order of transmission priority of various types of the beam report and CSI, i.e., {A>S>P, BM>CSI}. As illustrated in FIG. 4, different cases of transmission collisions are given, wherein the first row indicates a transmission collision on short PUCCH (S-PUCCH), the second row indicates a transmission collision on long PUCCH (L-PUCCH) and the third row indicates a transmission collision on PUSCH, and wherein "P" means periodic reporting information, "S" means semi-persistent reporting information, "A" means aperiodic reporting information; "CSI" means channel state information, "BM" means beam report, "I" or "II" means the type of CSI defined in NR system, "WB" means the frequency granularity of wideband or partial band, "SB" means the frequency granularity of subband, "P1" means Part 1 of CSI information.

As further illustrated in FIG. 4A, for the transmission collision on S-PUCCH, the transmission priority may be in an order of A-BM, A-WB-I-CSI, S-BM, S-WB-CSI, P-BM, and P-WB-I-CSI; for the transmission collision on L-PUCCH, the transmission priority may be in an order of S-BM, S-WB-I-CSI, P-BM, S-II-CSI-P1, S-SB-I-CSI, and P-WB-I-CSI; for the transmission collision on PUSCH, the transmission priority may be in an order of A-BM (aperiodic beam reporting), A-CSI (aperiodic CSI reporting), S-BM (semi-persistent beam reporting), and S-CSI (semi-persistent CSI reporting).

In another embodiment of the present disclosure, the predetermined priority rule may defines the transmission priority based on function requirement, for example BM>CSI or CSI>BM, which is dependent on function requirements of the communication system. In addition, it is possible to further set an internal priority rule defining transmission priority for different types of one or each of the beam report and the other uplink control information. For example, for beam reporting, it may determines the transmission priority of A-BM, S-BM and P-BM (periodic beam reporting) as {A-BM>S-BM>P-BM}. For another example, for CSI reporting, it may determine the transmission priority of A-CSI, S-CSI and P-CSI (periodic CSI reporting) as {A-CSI>S-CSI>P-CSI}.

For illustrative purpose, FIGS. 4B and 4C illustrate example function-first priority rules, each of which defines an order of transmission priority of various types of the beam report and CSI.

Similarly to FIG. 4A, FIG. 4B illustrates different cases of transmission collisions on S-PUCCH, L-PUCCH and PUSCH respectively, but FIG. 4B illustrates a function-first priority instead of a timing-first priority. As illustrated, BM reporting has a higher transmission priority than CSI reporting, i.e., BM>CSI. Especially, for the transmission collision on S-PUCCH, the transmission priority may be in an order of A-BM, S-BM, P-BM, A-WB-I-CSI, S-WB-CSI, and P-WB-I-CSI; for the transmission collision on L-PUCCH, the transmission priority may be in an order of S-BM, P-BM, S-WB-I-CSI, S-II-CSI-P1, S-SB-I-CSI, and P-WB-I-CSI; for the transmission collision on PUSCH, the transmission priority may be in an order of A-BM, S-BM, A-CSI, and S-CSI.

Reference is further made to FIG. 4C, which illustrates another function-first priority rules in different cases of transmission collisions on S-PUCCH, L-PUCCH and PUSCH respectively. Different from FIG. 4B, CSI reporting has a higher transmission priority than BM reporting, i.e., CSI>BM. Thus, in FIG. 4C, for the transmission collision on S-PUCCH, the transmission priority may be in an order of A-WB-I-CSI, S-WB-CSI, P-WB-I-CSI, A-BM, S-BM, and P-BM; for the transmission collision on L-PUCCH, the transmission priority may be in an order of S-WB-I-CSI, S-II-CSI-P1, S-SB-I-CSI, P-WB-I-CSI, S-BM, and P-BM; for the transmission collision on PUSCH, the transmission priority may be in an order of A-CSI, S-CSI, A-BM, and S-BM.

In embodiments of the present disclosure, the above priority rule can be a predetermined rule, which is known by both UE and gNB. In addition, it can also be used in a more flexible way. For example, the gNB may inform the UE of the priority rule to be used by setting a predetermined bit in DCI. For example, "0" may indicate a timing-first priority rule as illustrated in FIG. 4A, "1" may indicate a function-first priority rule as illustrated in FIG. 4C. In addition, the UE may also initiate a priority rule change by sending a beam failure recovery request (BFRQ) to the gNB so that the priority rule is changed to the rule as illustrated in FIG. 4B.

It shall be noted that the present disclosure is not limited to the above example priority rule. In some other embodiments of the present disclosure, it is possible to rank various types of information in a reverse order, which means the higher the transmission priority is, the lower the information is ranked in the order. Thus, the less important (lower transmission priority) information type will be ranked higher and the dropping operation will start from the information ranked higher. It shall also be noted that the manner for indicating priority rule is also given for illustrative purposes, and the present invention is not limited thereto.

By means of dropping a lower-priority part, the transmission collision between the beam reporting and another uplink control information can be addressed in a simply but efficient way.

In another aspect of the present disclosure, there is further provided another way to address the collision, which will described hereinafter with reference to FIG. 5. The method 500 can be performed at a terminal device, for example UE, or other like terminal devices.

FIG. 5 schematically illustrates a flow chart of another method for beam report transmission according to an embodiment of the present disclosure. As illustrated in FIG. 5, in step 501, UE checks if there is any uplink transmission resource available in predetermined resource set(s) for addressing the collision. If there is an uplink transmission resource for addressing the collision, in step 502, the beam report and the other uplink control information can be multiplexed on the uplink transmission resource available for addressing the collision. Thus, unlike the solution in FIG. 1, in the solution as proposed in FIG. 5, multiplexing strategy is adopted for the beam report and the other uplink control information like CSI to address the collision. In other word, the collided information can be offloaded to other available transmission resource.

Regarding multiplexing of the beam report and the other uplink control information like CSI, multiplexing choices may vary for different cases. For example, the beam report and the other uplink control information can be multiplexed in two separately coded parts on PUCCH, i.e., the collided information can be offloaded onto two separately coded parts on PUCCH. As another example, the beam report and the other uplink control information can be multiplexed on PUSCH; in other words, the collided information can be offloaded onto PUSCH. If there is more than one multiplexing choice, the multiplexing can be selected further based on a predetermined selection priority. The priority can be implicitly decided at UE according the payload size of UCI among available report resources predefined by the gNB, e.g., PUSCH>PUCCH. In addition, the selection priority can also be configured semi-statically through a higher-layer signaling (Media Access Control (MAC) control element (CE) or Radio Resource Control (RRC) signaling) or dynamically indicated from a network node, through for example DCI.

For illustrative purposes, FIG. 6 illustrates possible offloading solutions for difference cases. As illustrated, if the collision occurs on short PUCCH, it is possible to offload the collided information onto two separately coded parts of long PUCCH or onto PUSCH; if the collision occurs on long PUCCH, it is possible to offload the collided information onto two separately coded parts of another long PUCCH accommodating larger payload size (with format changed from for example format 3 to format 4), or onto PUSCH; if the collision occurs on PUSCH, there is no available resource to offload the collided information. In such a case, it may for example adopt a dropping strategy as described with reference to FIGS. 1 to 4.

For illustrative purposes, FIG. 7 illustrates two separately coded parts of PUCCH for beam report and CSI transmission. As illustrated in FIG. 7, the BM (beam) reporting and the CSI reporting, as two information blocks, could be separately coded with possibly two CRC blocks and transmitted as two different coded parts.

In addition, it shall be noted that in addition to the transmission collision on the PUSCH, it is also possible to combine the dropping strategy of FIG. 1 with the multiplexing strategy as described herein, when no uplink transmission resource is available for addressing the collision. In other words, when there is transmission collision between the beam report and another uplink control information, it may first check, before dropping a lower-priority part, if there is any uplink transmission resource available in pre-configured resource set(s) for addressing the collision. If there is such an uplink transmission resource, it may multiplex the beam report and the other uplink control information onto the uplink transmission resource; if there is no such uplink transmission resource, the dropping strategy is adopted to drop a lower-priority one of the beam report and the other uplink control information based on the predetermined priority rule.

In a further aspect of the present disclosure, there is further provided a solution of multiplexing the beam reporting with Hybrid Automatic Repeat request (HARQ). The multiplexing between the beam reporting and the HARQ can be performed on different PUCCH channels in the same slot, the same coded part in the same PUCCH channel, or different coded parts in the same PUCCH channel. The specific multiplexing mode to be used can be indicated by means of a resource configuration indicator from the network node.

For illustrative purposes, FIG. 8 illustrates an example multiplexing strategy between beam report (BM) and HARQ. In FIG. 8, there are given six possible values of resource configuration indicator, including "000," "001," "011," "010," "100," "101." For the indicator value "000", it denotes that the beam reporting (including periodic, semi-persistent, and aperiodic beam reporting) and HARQ may be multiplexed on two short PUCCHs in a time division multiplexing (TDM) mode. For the indicator value "001," it denotes that the beam reporting (including periodic, semi-persistent, and aperiodic beam reporting) and the HARQ can be multiplexed in two separately coded parts on a short PUCCH, for example Part 1 for HARQ, and Part 2 for BM. For the indicator value "011", it denotes that the beam reporting (including periodic and semi-persistent beam reporting) and HARQ may be multiplexed on a short PUCCH and a long PUCCH in a time division multiplexing (TDM) mode. For the indicator value "010", it denotes that the beam reporting (including periodic, and semi-persistent beam reporting) and the HARQ on two separately coded parts on a long PUCCH. For the indicator value "100," it denotes that the beam reporting (including semi-persistent and aperiodic beam reporting) and the HARQ can be carried on PUSCH. For the indicator value "101" it denotes that the beam reporting (including semi-persistent, and aperiodic beam reporting) can be carried on PUSCH and the HARQ can be carried on PUCCH in the same slot.

FIG. 9 illustrates two separately coded parts of PUCCH for beam reporting and HARQ. As illustrated in FIG. 9, for indicator value "001" and "010", the BM reporting and the HARQ, as two information blocks, could be separately coded with possibly two CRC blocks and transmitted as two different coded parts.

In a still further aspect of the present disclosure, there is provided a new resource selection manner for beam report. As illustrated in FIG. 2, for each type of beam reporting, there is more than one available channel and in such a case, it may select an uplink transmission resource for the beam reporting based on a predetermined resource selection rule. The predetermined selection rule may be based on either the payload size or the number of reported beams.

In an embodiment of the present disclosure, the predetermined selection rule may be based on the payload size. For example, for the beam reporting with a small payload size, it may use Shot PUCCH, for the beam reporting with a medium payload size, it may adopt long PUCCH, and for the beam reporting with a large payload size, it may use the PUSCH.

FIG. 10 illustrates example resource selection rues based on the payload size wherein the payload size L1 to L6 meets $L1<L2<L3<L4<L5<L6$. From FIG. 10, it is clear that P1 is a smaller payload range, P1 is a medium payload range, and P3 is a larger payload range. For the payload in P1, a short PUCCH may be selected for beam reporting; for the payload in P2, a long PUCCH may be selected for beam reporting; for the payload in P3, a PUSCH may be selected for beam reporting. Besides, it can also be seen that there is an overlapping range L2-L3 between P1 and P2 and another overlapping range L4-L5 between P2 and P3. Therefore, for the payload falling in such overlapping ranges, there is more than one resource selection option. In such a case, the gNB may indicate a selection order of uplink transmission resources for beam report transmission by means of semi-statically higher layer (RRC signaling or MAC CE) or dynamical indication like DCI.

In another embodiment of the present disclosure, the predetermined selection rule may be based on the number of reported beams. For example, for the number of reported beams in a first number range, it may use a short PUCCH; for the number of reported beams in another number range, it may further adopt a long PUCCH, or a PSUCH which is dependent on UE capability.

For illustrative purposes, FIG. 11 illustrates example resource selection rues based on the number of reported beams, wherein if $N<=2$, UE may use a short PUCCH, and if $N<=4$, UE may select long PUCCH or PUSCH based on its capability. Thus, if there are one or two beams to be reported, there might options including, short PUCCH and at least one of long PUCCH and PUSCH; if there is 3 or 4 beams to be reported, there are at least options including long PUCCH and PUSCH. In such a case, the predetermined selection rule may further define a selection order of uplink transmission resources for beam reporting transmission so that the UE could select one reporting channel from these available reporting channels. For example, there might be a default selection order at UE: short PUCCH>PUSCH>long PUCCH. In addition, the selection order can also be configured by semi-statically higher-layer (such as MAC CE or RRC signaling) or dynamically indicated by means of DCI.

In a yet further aspect of the present disclosure, there is further provided another beam report transmission solution to address the transmission resource waste problem. Next reference will be made to FIG. 12 to describe it in details.

FIG. 12 schematically illustrates a flow chart of a method 1200 of beam reporting transmission according to an embodiment of the present disclosure. The method 1200 can be performed at a terminal device, for example UE, or other like terminal devices.

As illustrated in FIG. 12, in step 1201, a first beam report segment is transmitted, wherein the first beam report segment contains an identity for a first beam, a channel quality indication for the first beam and a subsequent segment indication information for indicating whether a subsequent beam report segment is present or not. Then in step 1202, at least one subsequent beam report segment containing information on at least one subsequent beam is transmitted only if the subsequent segment indication information indicates that the subsequent beam report segment is present. Therefore, in the present disclosure, it is proposed to divide a beam report into at least two segments. The first segment may contain subsequent segment indication information which can indicate whether a subsequent beam report segment is present or not and the second beam report segment is transmitted only if there are subsequent beam report segments. In this way, the subsequent segment is transmitted only if required, instead of padding bits, and thus the transmission resource can be utilized in a more efficient way. Furthermore, in case of only the first segment being transmitted, the UE may choose a different PUCCH format and/or coding rate so as to transmit the first segment more compactly and reliably. Hereinafter, reference will be made to FIGS. 13 to 21 to described server specific implementations as provided herein.

FIG. 13 schematically illustrates a diagram of two example beam report segments according to an embodiment of the present disclosure. As illustrated in FIG. 13, the beam report is divided into two segments, i.e., segment 1 and segment 2. The segment 1 contains beam ID 1 (6 bits) for a first beam (for example the first strongest beam), and its RSRP value RSRP1 (7 bits) and differential RSRP value RSRP 2 (4 bits) for the second beam (for example, the second strongest beam). For RSRP 2, in addition to fifteen values of 4 bits for the differential RSRP, the remaining value can be used to indicate an outage of beam RSRP, wherein the outage means that a differential RSRP value is larger than 16* stepping size. If the value of 4 bits of RSRP2 represents a regular differential value, it means there is subsequent beam report segment; on the contrast, if its value of 4 bits represents an outage, no subsequent segment will be transmitted. Segment 2 may contain beam IDs for the reported beams except the first beam and the different RSRP values except those already contained within segment 1. The dashed line of segment 2 means that unlike segment 1, segment 2 might be absent, which is dependent on the value of RSRP 2 contained in segment 1.

FIG. 14 illustrates a table of payload size of two beam report segments according to the solution as described in FIG. 13. The total payload size of segment 1 and segment 2 is similar to that of the existing solution since there is no added any addition bit; however since segment 2 might be not transmitted, the transmission resource might be reduced.

It shall be noted that the two beam report segments can be transmitted in the same reporting channels or in different reporting channels. For example, segment 1 can be transmitted on short PDCCH, and segment 2 can be transmitted on long PDCCH as illustrated in FIG. 15. As another example, the two beam report segments can also be transmitted on long PDCCH as illustrated in FIG. 16.

Figure 17:
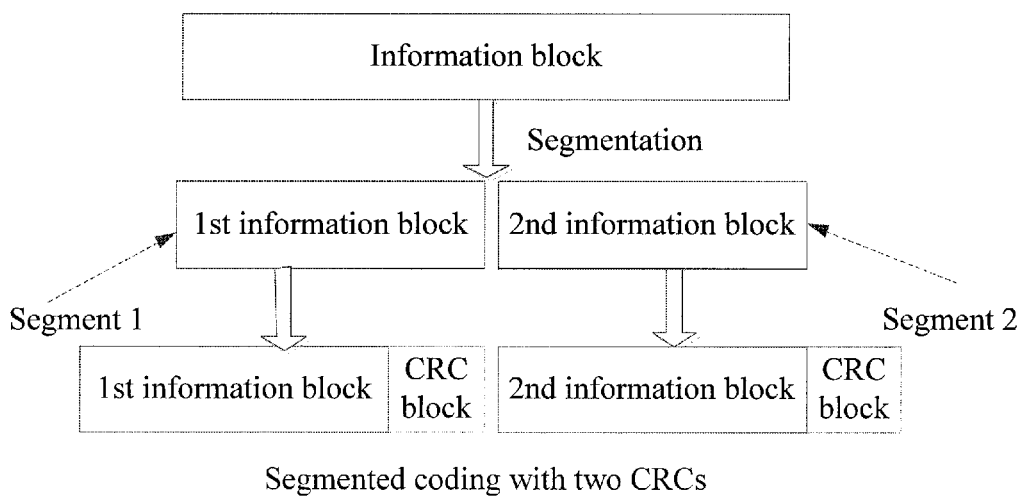
FIG. 17 schematically illustrates a further example transmission of two beam report segments according an embodiment of the present disclosure.

In addition, on the same reporting channels, the two beam report segments can also be transmitted in the same coded part; alternatively, they may also be transmitted in separately coded parts in the same reporting channel. As illustrated in FIG. 17, segment 1 can be transmitted in a first information block and segment 2 can be transmitted in a second information block, wherein the first and second information blocks are separately coded with two CRCs. Resource allocation for segment 1 can be configured by the gNB through a higher layer signaling. Resource allocation for segment 2 can be dynamically indicated by the gNB through DCI, which may use a resource selected from a predefined uplink resource set.

FIG. 18 schematically illustrates a diagram of other example beam report segments according to an embodiment of the present disclosure. Different from that illustrated in FIG. 13, RSRP 2 is not contained in segment 1 to indicate the outage; instead, one new bit "a" is contained to indicate whether there is subsequent segment. For example, "0" is used to indicate no subsequent segment; if "a" bit is "0", segment 2 will not be transmitted.

FIG. 19 illustrates the payload size of two beam report segments according to the solution as described in FIG. 28. The total payload size of segment 1 and segment 2 is one bit more than that of the existing solution due to a newly added bit a; however since segment 2 might be not transmitted, the transmission resource might be reduced as well.

Figure 21:
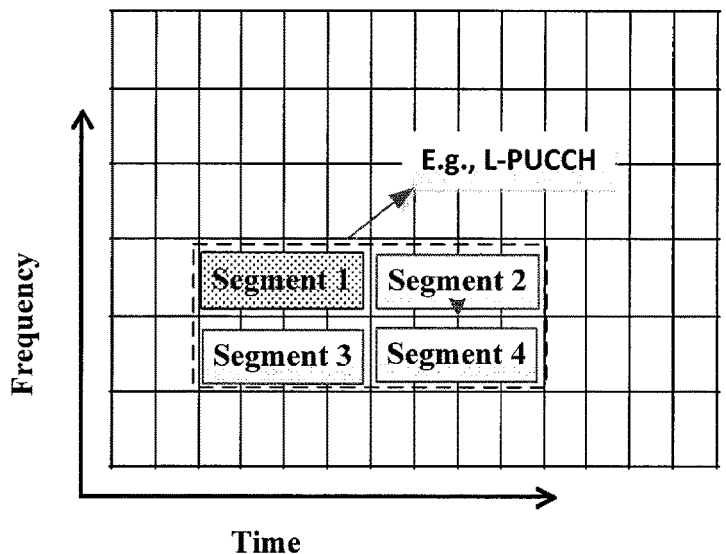
FIG. 21 schematically illustrates an example transmission of two beam report segments according an embodiment of the present disclosure.

FIG. 20 schematically illustrates a diagram of further example beam report segments according to an embodiment of the present disclosure. Different from that illustrated in FIGS. 12 and 18, the number of the beams to be reported (these beams not in outage) is contained in segment 1 to indicate the number of subsequent segments. If the number of beams is zero, it means no subsequent segment, if the number of beams is larger than 1, it means the presence of subsequent segment. These segments can be transmitted on the same reporting resources, as separate segments, for example on long PUCCH as illustrated in FIG. 21.

It shall be noted that although some aspects or embodiments of the present disclosure are described separately but they can also be combined together to form a new solution; on the other hand, some aspects or embodiments of the present disclosure are described in combination with other aspects or embodiments, but they can also be implemented separately as a standalone solution.

Hereinbefore, solutions for beam report transmission on the terminal device side are described with reference to FIGS. 1 to 21 and next, solutions for beam report receiving on the network side will be described with reference to FIGS. 22 to 24.

Figure 22:
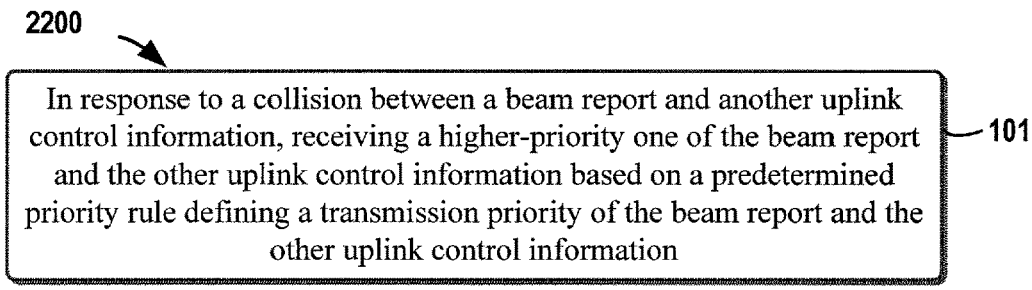
FIG. 22 schematically illustrates a flow chart of a method for beam report receiving according to an embodiment of the present disclosure.

FIG. 22 schematically illustrates a flow chart of a method for beam report receiving according to an embodiment of the present disclosure. The method 2200 can be performed at a network node, for example gNB, or other like network nodes.

As illustrated in FIG. 22, in step 2201, gNB may receive, in response to a collision between a beam report and another uplink control information, a higher-priority one of the beam report and the other uplink control information based on a predetermined priority rule defining a transmission priority of the beam report and the other uplink control information. When a collision between a beam report and another uplink control information is present, the gNB can use the same predetermined priority rule as that in UE to determine which one of the beam report and the other uplink control information is dropped and which one of them is transmitted. In such a way, only the higher-priority one of the beam report and the other uplink control information will be received by gNB.

Similar to the predetermined priority rule in the terminal device, the predetermined priority rule at the gNB may define the transmission priority based on either timing requirement or function requirement. Moreover, the predetermined priority may further include an internal transmission priority configured for different types of one or each of the beam report and the other uplink control information. The priority rules used in the terminal device and the network node are exactly the same and thus for details about the priority rule, one can refer to description with reference to FIGS. 1 to 4C.

Figure 23:
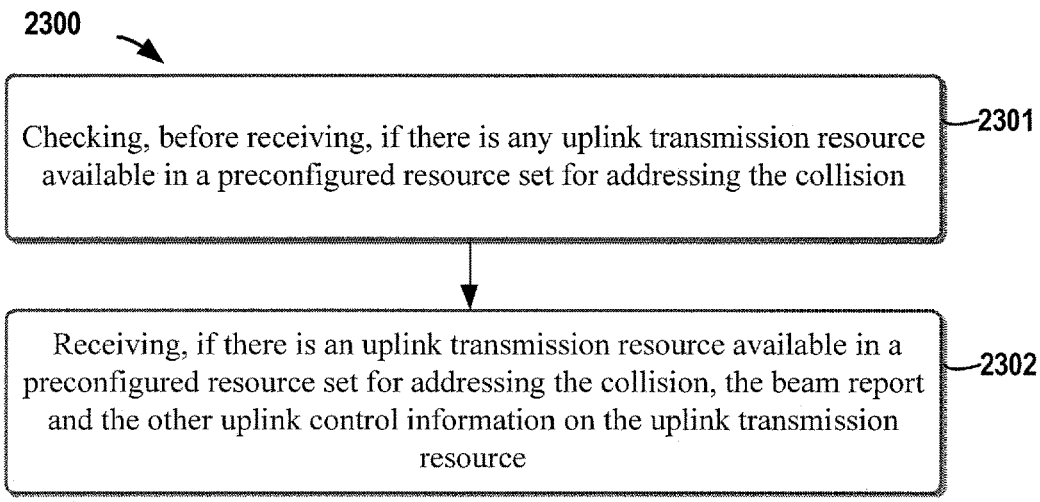
FIG. 23 schematically illustrates a flow chart of another method for beam report receiving according to an embodiment of the present disclosure.

FIG. 23 schematically illustrates a flow chart of another method for beam report receiving according to an embodiment of the present disclosure. The method 2300 can be performed at a network node, for example gNB, or other like network nodes.

As illustrated in FIG. 23, in step 2301, before receiving uplink control information, gNB checks if there is any uplink transmission resource available in—predetermined resource set(s) for addressing the collision. If there is an uplink transmission resource for addressing the collision, in step 2302, the gNB can receive the beam report and the other uplink control information on the uplink transmission resource available for addressing the collision.

Thus, unlike the solution in FIG. 22, in the solution as proposed in FIG. 23, the gNB first determines whether a multiplexing strategy is adopted for the beam report and the other uplink control information at the terminal device to address the collision, if yes, the gNB will receive the beam report and the other uplink control information on the available uplink transmission resource.

Regarding multiplexing of the beam report and the other uplink control information like CSI, multiplexing choices may vary for different cases as described with reference to FIG. 6. Thus, the uplink transmission resource carrying the beam report and the other uplink control information may include any of Physical Uplink Control Channel (PUCCH); and Physical Uplink Shared Channel (PUSCH). In addition, the beam report and the other uplink control information can be carried in two separately coded parts on PUCCH, as also illustrated in FIG. 6. If there is more than one multiplexing choice, the uplink transmission resource carrying the beam report and the other uplink control information may be determined based on a predetermined selection priority similar to that in the terminal device.

In another aspect of the present disclosure, the beam report receiving may further include receiving the beam report and Hybrid Automatic Repeat request (HARQ) on/in any of: different reporting channels; the same coded part on the same reporting channel; and different coded parts on the same reporting channels. In other words, the gNB may receive the multiplexed beam reporting and HARQ. For details about the multiplexing strategy of the beam reporting and HARQ, please refer to the description with reference to FIGS. 8 and 9.

In another embodiment of the present disclosure, in case of beam report receiving, the method may further include determining, from preconfigured resource set(s), an uplink transmission resource for the beam report based a predetermined selection rule. The predetermined selection may be based on any of the payload size or the number of reported beams. If there is more than one reporting resource option, the uplink transmission resource for the beam report can be further determined based on a selection order of uplink transmission resources for beam report transmission. By means of such a selection order, the gNB may determine the uplink transmission resource used by the terminal device for beam report transmission and receiving the beam report on the uplink transmission resource.

Figure 24:
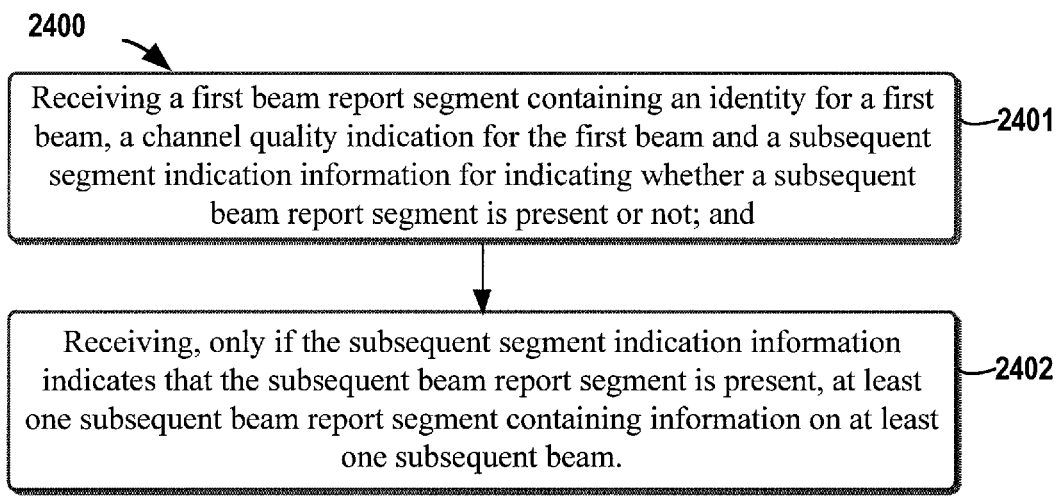
FIG. 24 schematically illustrates a flow chart of a further method for beam report receiving according to an embodiment of the present disclosure.

FIG. 24 schematically illustrates a flow chart of a further method for beam report receiving according to an embodiment of the present disclosure. The method 2400 can be performed at a network node, for example gNB, or other like network nodes.

As illustrated in FIG. 24, first in step 2401, the gNB may receive a first beam report segment containing an identity for a first beam, a channel quality indication for the first beam and a subsequent segment indication information for indicating whether a subsequent beam report segment is present or not. Then, if the gNB detects that the subsequent segment indication information indicates that the subsequent beam report segment is present, the gNB may receive at least one subsequent beam report segment containing information on at least one subsequent beam. In other words, the first segment will be decoded before the segment 2, and the segment 2 is decoded only when the subsequent segment indication information indicates the presence of the subsequent segment.

As described with reference to FIG. 13, the subsequent segment indication information can be indicated by a predetermined value of a channel quality indication for a subsequent beam. As also described with reference to FIGS. 18 and 20, the subsequent segment indication information is indicated by a predetermined bit. The predetermine bit can be a single bit simply indicating whether there is subsequent segment or not (see FIG. 18), or several bits (for example 2 bits) indicating the number of the subsequent segments (see FIG. 20).

Hereinabove, embodiments of the method of a beam report receiving are described in brief hereinbefore with reference to FIGS. 22 to 24. However, it can be understood that operations at the terminal device are corresponding to those at the network node and thus for some details of operations, one may refer to description with reference to FIGS. 1 to 21.

Figure 25:
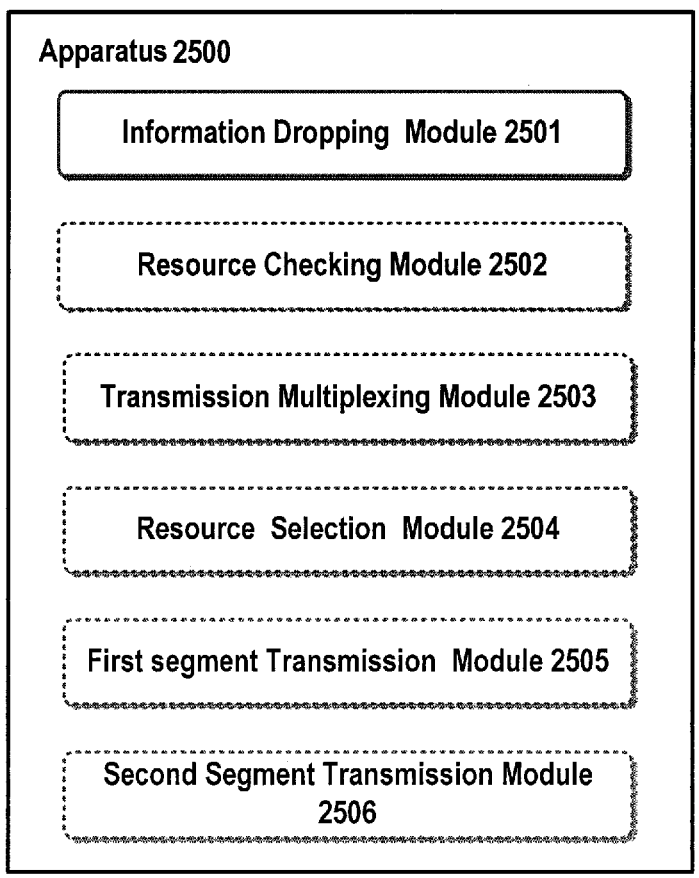
FIG. 25 schematically illustrates a block diagram of an apparatus for beam report transmission according to an embodiment of the present disclosure.

FIG. 25 further schematically illustrates a block diagram of an apparatus for beam report transmission according to an embodiment of the present disclosure. The apparatus 2500 can be performed at a terminal device, for example UE, or other like terminal devices.

As illustrated in FIG. 25, the apparatus 2500 may include an information dropping module 2501, which can be configured to drop, in response to a collision between a beam report and another uplink control information, a lower-priority one of the beam report and the other uplink control information based on a predetermined priority rule defining a transmission priority of the beam report and the other uplink control information.

In an embodiment of the present disclosure, the predetermined priority rule defines the transmission priority based on either timing requirement or function requirement.

In another embodiment of the present disclosure, the predetermined priority rule may further include an internal transmission priority configured for different types of one or each of the beam report and the other uplink control information.

In a further embodiment of the present disclosure, the apparatus 2500 may further include: a resource checking module 2502 and a transmission multiplexing module 2503. The resource checking module may be configured to check, before the dropping, if there is any uplink transmission resource available in a preconfigured resource set for addressing the collision. The transmission multiplexing module 2503 may be configured to multiplex, if there is an uplink transmission resource available for addressing the collision, the beam report and the other uplink control information on the uplink transmission resource.

In a still further embodiment of the present disclosure, the multiplexing of the beam report and the other uplink control information may include any selection of: multiplexing the beam report and the other uplink control information in two separately coded parts on Physical Uplink Control Channel (PUCCH); and multiplexing the beam report and the other uplink control information on Physical Uplink Shared Channel (PUSCH).

In a yet further embodiment of the present disclosure, the multiplexing is selected based on a predetermined selection priority.

In another embodiment of the present disclosure, the transmission multiplexing module 2503 may be further configured to multiplex the beam report with Hybrid Automatic Repeat request (HARQ) on/in any of: different PUCCH channels in the same slot; the same coded part in the same PUCCH channel; and different coded parts in the same PUCCH channel.

In a further embodiment of the present disclosure, the apparatus 2500 may further include a resource selection module 2504 configured to select, from a preconfigured resource set, an uplink transmission resource for the beam report based a predetermined selection rule regarding any of the payload size or the number of reported beams.

In a still further embodiment of the present disclosure, the predetermined selection rule may further define a selection order of uplink transmission resources for beam report transmission.

In a yet further embodiment of the present disclosure, in case of beam report transmission, the apparatus 2500 may further include a first segment transmission module 2505 and a second segment transmission module 2506. The first segment transmission module 2505 can be configured to transmit a first beam report segment containing an identity for a first beam, a channel quality indication for the first beam and a subsequent segment indication information for indicating whether a subsequent beam report segment is present or not. The second segment transmission module 2506 can be configured to transmit, only if the subsequent segment indication information indicates that the subsequent beam report segment is present, at least one subsequent beam report segment containing information on at least one subsequent beam.

In another embodiment of the present disclosure, the subsequent segment indication information may be indicated by a predetermined value of a channel quality indication for a subsequent beam.

In a further embodiment of the present disclosure, the subsequent segment indication information may be indicated by a predetermined bit.

In a still further embodiment of the present disclosure, the first beam report segment and the at least one subsequent segment may be transmitted on/in any of: different reporting channels; the same coded part on the same reporting channel; and different coded parts on the same reporting channels.

Figure 26:
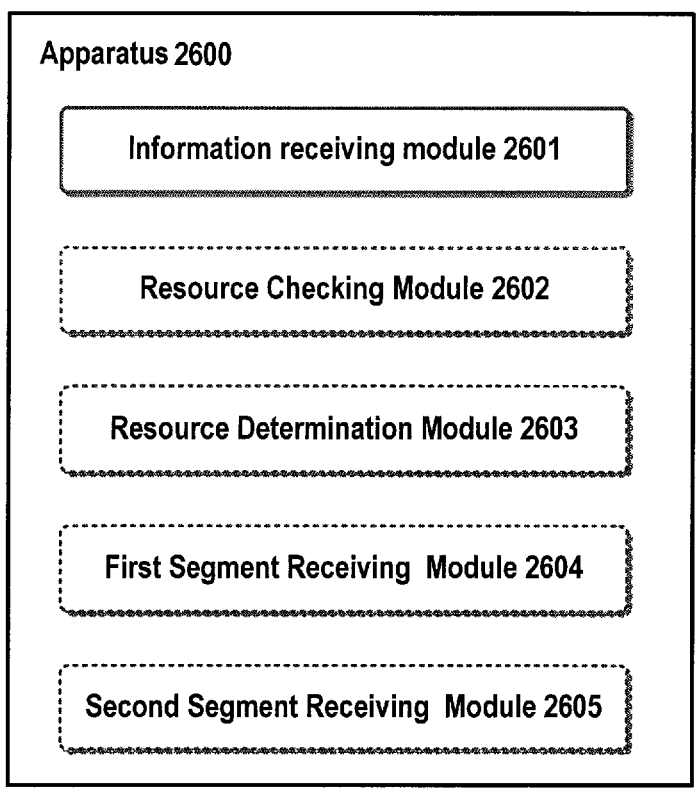
FIG. 26 schematically illustrates a block diagram of an apparatus for beam report receiving according to an embodiment of the present disclosure.

FIG. 26 schematically illustrates a block diagram of an apparatus for beam report receiving according to a further embodiment of the present disclosure. The apparatus 2600 can be performed at a network node, for example gNB, or other like network nodes.

As illustrated in FIG. 26, the apparatus 2600 may include a control information receiving module 2601, which can be configured to receive, in response to a collision between a beam report and another uplink control information, a higher-priority one of the beam report and the other uplink control information based on a predetermined priority rule defining a transmission priority of the beam report and the other uplink control information.

In an embodiment of the present disclosure, the predetermined priority rule may define the transmission priority based on either timing requirement or function requirement.

In another embodiment of the present disclosure, the predetermined priority may further include an internal transmission priority configured for different types of one or each of the beam report and the other uplink control information.

In a further embodiment of the present disclosure, the apparatus 2600 may further include resource checking module 2602 which is configured to check, before the receiving, if there is any uplink transmission resource available in a preconfigured resource set for addressing the collision. The information receiving module 2601 may be configured to receive, if there is an uplink transmission resource available in a preconfigured resource set for addressing the collision, the beam report and the other uplink control information on the uplink transmission resource.

In a still further embodiment of the present disclosure, the uplink transmission resource may include any of: Physical Uplink Control Channel (PUCCH); and Physical Uplink Shared Channel (PUSCH).

In a yet further embodiment of the present disclosure, the uplink transmission resource carrying the beam report and the other uplink control information may be determined based on a predetermined selection priority.

In another embodiment of the present disclosure, the information receiving module 2601 may be further configured to receive the beam report and Hybrid Automatic Repeat request (HARQ) on/in any of: different reporting channels; the same coded part on the same reporting channel; and different coded parts on the same reporting channels.

In a further embodiment of the present disclosure, in case of beam report receiving, the apparatus 2600 may further include a resource determination module 2603 determining, from a preconfigured resource set, an uplink transmission resource for the beam report based a predetermined selection rule regarding any of the payload size; or the number of reported beams.

In a still further embodiment of the present disclosure, the predetermined selection rule may further define a selection order of uplink transmission resources for beam report transmission.

In a yet further embodiment of the present disclosure, the apparatus 2600 may further include a first segment receiving module 2604 and a second receiving module 2605. The first segment receiving module 2604 may be configured to receive a first beam report segment containing an identity for a first beam, a channel quality indication for the first beam and a subsequent segment indication information for indicating whether a subsequent beam report segment is present or not. A second segment receiving module 2605 may be configured to receive, only if the subsequent segment indication information indicates that the subsequent beam report segment is present, at least one subsequent beam report segment containing information on at least one subsequent beam.

In another embodiment of the present disclosure, the subsequent segment indication information may be indicated by a predetermined value of a channel quality indication for a subsequent beam.

In a further embodiment of the present disclosure, the subsequent segment indication information may be indicated by a predetermined bit.

In a still further embodiment of the present disclosure, the first beam report segment and the at least one subsequent segment may be received on/in any of different reporting channels; the same coded part on the same reporting channel; and different coded parts on the same reporting channels.

Hereinbefore, apparatuses 2500 and 2600 are described with reference to FIGS. 25 and 26 in brief. It can be noted that the apparatuses 2500 and 2600 may be configured to implement functionalities as described with reference to FIGS. 1 to 24. Therefore, for details about the operations of modules in these apparatuses, one may refer to those descriptions made with respect to the respective steps of the methods with reference to FIGS. 1 to 24.

It is further noted that components of the apparatuses 2500 and 2600 may be embodied in hardware, software, firmware, and/or any combination thereof. For example, the components of apparatuses 2500 and 2600 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 2500 and 2600 may include at least one processor. The at least one processor suitable for use with embodiments of the present disclosure may include, by way of example, both general and special purpose processors already known or developed in the future. Apparatuses 2500 and 2600 may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2500 and 2600 to at least perform operations according to the method as discussed with reference to FIGS. 1 to 24 respectively.

Figure 27:
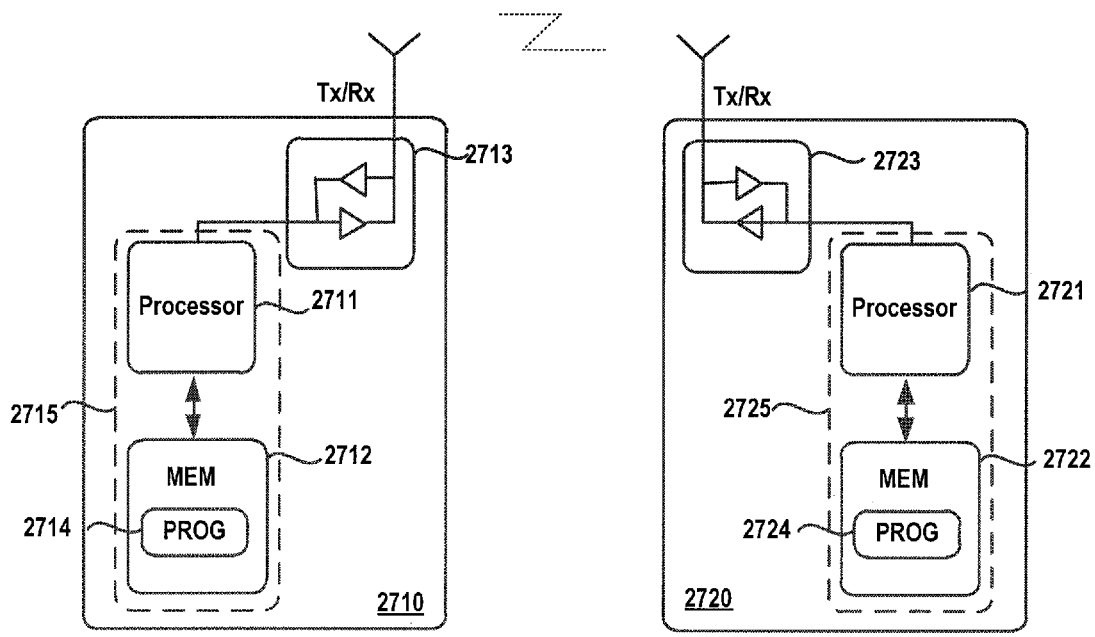
FIG. 27 schematically illustrates a simplified block diagram of an apparatus 2710 that may be embodied as or comprised in a network node like gNB, and an apparatus 2720 that may be embodied as or comprised in a terminal device like UE as described herein.

FIG. 27 further illustrates a simplified block diagram of an apparatus 2710 that may be embodied as or comprised in a network node like a base station (gNB) in a wireless network and an apparatus 2720 that may be embodied as or comprised in a terminal device like UE as described herein.

The apparatus 2710 comprises at least one processor 2711, such as a data processor (DP) and at least one memory (MEM) 2712 coupled to the processor 2711. The apparatus 2710 may further include a transmitter TX and receiver RX 2713 coupled to the processor 2711, which may be operable to communicatively connect to the apparatus 2720. The MEM 2712 stores a program (PROG) 2714. The PROG 2714 may include instructions that, when executed on the associated processor 2711, enable the apparatus 2710 to operate in accordance with embodiments of the present disclosure, for example to perform any of methods 2200, 2300, 2400, or their combinations. A combination of the at least one processor 2711 and the at least one MEM 2712 may form processing means 2715 adapted to implement various embodiments of the present disclosure.

The apparatus 2720 comprises at least one processor 2721, such as a DP, and at least one MEM 2722 coupled to the processor 2721. The apparatus 2720 may further include a suitable TX/RX 2723 coupled to the processor 2721, which may be operable for wireless communication with the apparatus 2710. The MEM 2722 stores a PROG 2724. The PROG 2724 may include instructions that, when executed on the associated processor 2721, enable the apparatus 2720 to operate in accordance with the embodiments of the present disclosure, for example to perform any of methods 100, 500, 1200 or their combinations. A combination of the at least one processor 2721 and the at least one MEM 2722 may form processing means 2725 adapted to implement various embodiments of the present disclosure.

Various embodiments of the present disclosure may be implemented by computer program executable by one or more of the processors 2711, 2721, software, firmware, hardware or in a combination thereof.

The MEMs 2712 and 2722 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2711 and 2721 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method comprising:

transmitting a 1st report; and dropping a 2nd report based on a transmission priority of the 1st report and the 2nd report if the 1st report and the 2nd report are colliding, wherein the transmission priority is in order of:
  semi-persistent report carrying L1-RSRP (Reference Signal Received Power) on PUCCH (Physical Uplink Control CHannel);
  semi-persistent CSI (Channel State Information) report on PUCCH;
  periodic report carrying L1-RSRP on PUCCH; and
  periodic CSI report on PUCCH, wherein the semi-persistent CSI report on PUCCH is different from the semi-persistent report carrying L1-RSRP on PUCCH, and wherein the periodic CSI report on PUCCH is different from the periodic report carrying L1-RSRP on PUCCH.

* * * * *